United States Patent [19]

Friis-Hansen

[11] 4,283,202

[45] Aug. 11, 1981

[54] METHOD AND APPARATUS FOR BURNING CACO3 AND MGCO3 MATERIALS

[76] Inventor: J. Friis-Hansen, 77 Vigerslev Alle, DK-2500 Valby Copenhagen, Denmark

[21] Appl. No.: 36,230

[22] Filed: May 4, 1979

[30] Foreign Application Priority Data

May 8, 1978 [GB] United Kingdom .............. 18227/78

[51] Int. Cl.$^3$ ...................... G01N 33/38; G01N 27/00
[52] U.S. Cl. ............................. 23/230 A; 23/230 PC; 422/62; 422/111; 432/37
[58] Field of Search .......... 23/230 R, 230 A, 230 PC; 422/62, 105, 111; 432/19, 23, 24, 36, 37

[56] References Cited

U.S. PATENT DOCUMENTS

| | | | |
|---|---|---|---|
| 3,645,697 | 2/1972 | Hoffman, Jr. ..................... | 23/230 A |
| 3,716,333 | 2/1973 | Peuschel et al. ................... | 23/230 R |
| 3,841,155 | 10/1974 | Koehler et al. .......................... | 73/15 |
| 3,870,465 | 3/1975 | Marechal ........................... | 23/230 A |
| 3,994,164 | 11/1976 | Regenass et al. .................. | 23/230 R |
| 4,042,328 | 8/1977 | Seymor .................................. | 162/49 |
| 4,077,763 | 3/1978 | Jager et al. ............................. | 432/36 |

FOREIGN PATENT DOCUMENTS

| | | |
|---|---|---|
| 468912 | 11/1928 | Fed. Rep. of Germany . |
| 2332135 | 1/1975 | Fed. Rep. of Germany . |
| 2355952 | 5/1975 | Fed. Rep. of Germany . |
| 2158377 | 10/1977 | Fed. Rep. of Germany . |

Primary Examiner—Michael S. Marcus

[57] ABSTRACT

A method for automatically controlling the burning process for CaCO$_3$ and MgCO$_3$ materials in a kiln which includes feeding burnt material and liquid reagent into a reaction chamber. Then, the amount of heat per unit weight burnt material per unit time liberated in the reaction chamber is determined. The kiln is controlled using the amount of heat determined above.

21 Claims, 1 Drawing Figure

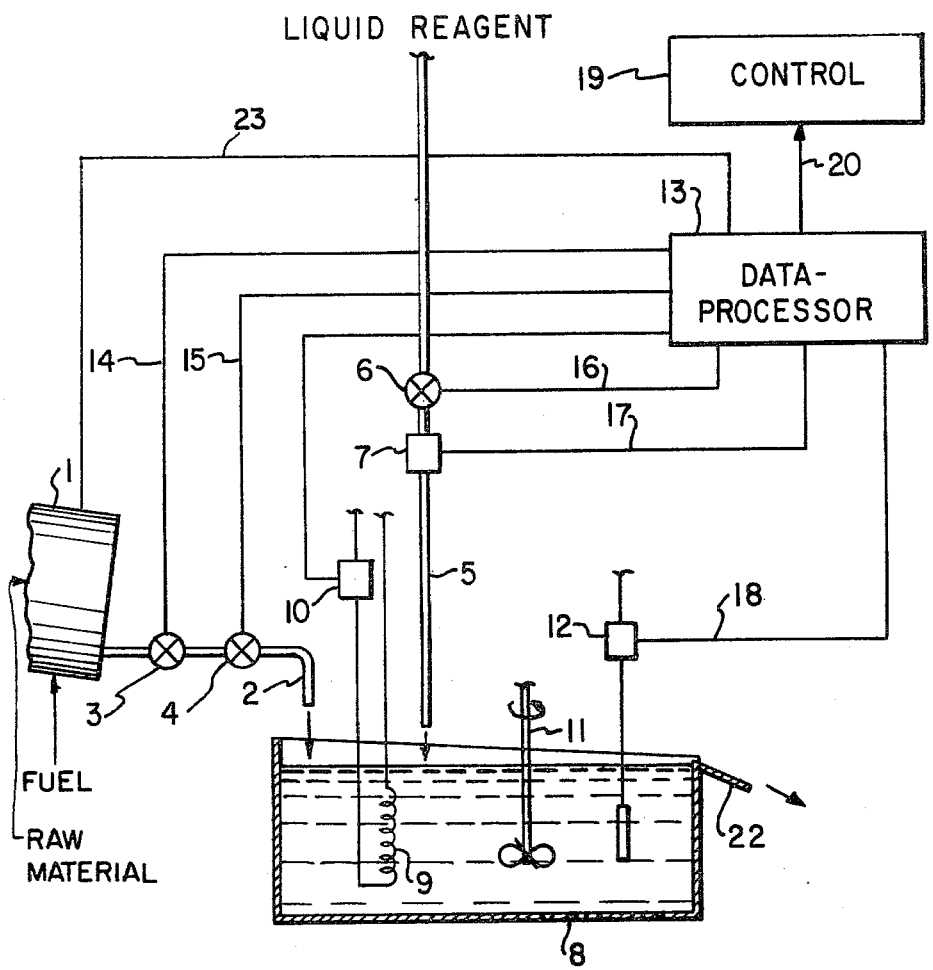

METHOD AND APPARATUS FOR BURNING CACO₃ AND MGCO₃ MATERIALS

DESCRIPTION

TECHNICAL FIELD

The present invention relates to automatic control of the process for burning $CaCO_3$ and/or $MgCO_3$ materials in rotary or stationary kilns, $CaCO_3$ and $MgCo_3$ materials being materials composed in whole or in part of either $CaCO_3$ or $MgCO_3$.

BACKGROUND ART

Manufacture of burnt lime by burning calcium carbonate or temperatures ranging from approximately 900° to 1300° C. is known. That burning decomposes $CaCO_3$ into $CaO$ and $CO_2$ and causes structural alterations in the product which result in a reduction in volume known as shrinking. This volume reduction varies from about 10 to about 60 percent depending upon the burning temperature and the impurity content of the raw $CaCO_3$ material.

Low burning temperatures—about 900° C.—result in insignificant shrinkage and a very porous product. Also, the reaction time for $CO_2$ expulsion is so slow that it is not technically feasible to operate at such low temperatures. $CO_2$ expulsion at higher temperatures is faster—takes place at sufficiently high velocity—but under these conditions the material shrinks more, which causes a reduction in the porosity of the product.

Normally, the product is cooled after burning. Cooling often transforms the product into $Ca(OH)_2$ by reaction—slaking—with water.

Depending upon operating conditions, it is sometimes desirable that slaking occurs quickly; but it may also be desirable that slaking occurs slowly. Slaking velocity is dependent upon reactivity of the burnt product. Reactivity is dependent on porosity which again is primarily dependent upon burning temperature, burning time and impurity content of the raw material. In order to produce a product having a certain reactivity, manufactured from a raw material having a fluctuating impurity content, compensating adjustments for the burning temperature and for the burning time are required.

Previously, to achieve a desired reactivity of the product when burning lime, a current, discontinuous, manual quality control had to be carried out for the burnt lime, which included mixing a specified amount of water having a certain temperature, for example 20° C., with a specified amount of burnt lime having a certain fineness and temperature. This is slaking of a sample under controlled conditions. Because the hydration reaction is exothermic, the reactivity of the burnt lime can be determined either by measuring the time necessary for achieving a given rise in temperature or by measuring the temperature increase achieved during a given time.

If the reactivity is poor, the material has been burnt too hard. Consequently, the supply of fuel to the kiln and the material residence time in the kiln must be reduced.

Burning of $MgCO_3$ and dolomite involve similar considerations.

It is desirable to maintain optimum operating conditions to produce a homogeneous product having a desired reactivity and to bring about automatic control of the burning conditions.

Continuous analyses and reactivity determinations of liquid products is known. German Patent Specification No. 468,912 relates to a method of analyzing a liquid chemical product based on its heat of reaction by reaction with a liquid reagent. The chemical product and the reagent flow through corresponding, separate, intermediate receivers where their temperatures are measured. Then, they are mixed in a reactor functioning as a calorimeter; and temperature is measured. Temperature increase is a function of the heat liberated in the reactor and serves to determine the concentration of the product.

U.S. Pat. No. 3,716,333 relates to a method of analysis for determining the concentration of Mg and K in which heat exchange due to reaction with a suitable reagent is used to determine concentration. In this method, sample and reagent are fed at a constant temperature to a reaction chamber immersed in a water bath, and the temperature difference between water bath and reaction chamber is used to measure concentration.

Isothermic calorimetry is a well known technique of analysis in which the content of the calorimeter is maintained at a constant temperature. Such a technique is described in U.S. Pat. Nos. 3,841,155 and 3,994,164 and German OS No. 2,355,952. According to this process, a calorimeter is immersed in a water bath having a constant temperature $T_{bath}$. The calorimeter has a heat exchanger so that its contents can be maintained at a constant temperature $T_{cal}$ higher than $T_{bath}$. If sample and reagent are continuously fed into the calorimeter at a constant temperature and flow rate and if the heat liberated or consumed by the heat exchanger is regulated so that the temperature difference $T_{cal}-T_{bath}$ is constant, the quantity of heat liberated or consumed by the heat exchanger can be used as a measure of the thermal efficiency of the reaction between sample and reagent. The sum of the heat from the reaction and the heat from the heat exchanger is maintained constant.

I have invented a process and apparatus in which the reactivity of solids is utilized and employed for controlling their burning process.

DISCLOSURE OF INVENTION

A method for controlling burning of $CaCO_3$ and/or $MgCO_3$ materials in a kiln comprising, feeding burnt material into a reaction chamber, feeding liquid reagent into the reaction chamber, determining amount of heat per unit weight burnt material per unit time liberated in the reaction chamber, and controlling burning in the kiln in dependenc upon the heat liberated in the reaction chamber. Thus, the amount of heat per unit weight burnt material per unit time liberated in the reaction chamber is determined and the kiln is controlled using the amount of heat determined above.

More specifically, the present method is applicable to controlling the burning of $CaCO_3$ and/or $MgCO_3$ materials in a kiln, particularly a rotary kiln. The method comprises feeding a flow of burnt material and a flow of liquid reagent to a reaction chamber, agitating said burnt material and liquid reagent, measuring the temperature and feed rate of the two flows fed to the reaction chamber, measuring the temperature of said agitated burnt material and liquid reagent, determining a measure for amount of heat per unit weight burnt material per unit of time liberated by reaction between said burnt material and the liquid reagent, and using the quantity as a control parameter for the burning of $CaCO_3$ and $MgCO_3$ materials. Thus, according to the inventive process the temperature and feed rate of the two flows to the reaction chamber and the temperature of the agitated burnt material and liquid reagent mixture are measured. A quantity constituting a measure of the amount of heat per unit weight burnt material pr unit time liberated by the reaction between the burnt material and liquid reagent is determined. That quantity is the quantity which is utilized as a control parameter for the burning of the $CaCO_3$ and/or $MgCO_3$ materials.

In the present context, the term "liquid reagent" means a liquid which reacts exothermally with the burnt material. Typical reagents include water, aqueous solutions, and organic compounds such as monohydric or polyhydric alcohols, for example glycol or ethanol.

The flow of burnt material and of liquid reagent to the reaction chamber may be continuous or periodic. A corresponding flow of reaction mixture will usually be simultaneously removed from the reaction chamber.

A particular advantage of the present method is that it may be carried out continuously or periodically. This ensures manufacture of a product having a uniform reactivity, even when using raw materials having substantial variation in its impurity content. This is often the case when using lime from miscellaneous mineralogic deposits and when using chemically precipitated raw materials, for instance, from causticization processes. When using such raw materials, it has previously been extremely difficult to ensure manufacture of a product having suitable, uniform reactivity because of the discontinuous nature of the quality control used in the prior art.

Another advantage of the present method is that the process in the reaction chamber is of the same nature or may even coincide with part of the practical, final process of manufacture which takes place in slaking machines by manufacture of hydrated lime and in causticization plants.

A flow of burnt material and liquid reagent may be continuously fed to the reaction chamber. Temperature fluctuations in the reaction mixture, derived from a periodic, stepwise addition of reaction components, are eliminated to the highest possible extent.

The residence time for the reactants in the reaction chamber is preferably chosen so that it is less than or short compared with the period of fluctuations expected in the burning conditions. Typically, 60 liters of water per hour, and 15 kilos of burnt lime per hour are fed to a reactor having a volume of 10 liters, which corresponds to a residence time of about 10 min.

One suitble manner for carrying out the present method involves a constant temperature reaction in the reaction chamber using the principle of isothermic calorimetry. The reaction chamber temperature is kept constant by heat exchanger means and the amount of heat liberated by the reaction is determined by measuring the heat given off or absorbed by the heat exchange means.

Another way of carrying out the present method involves maintaining a constant temperature of the reaction mixture by regulating the temperature of the liquid fed to the reaction chamber. If the temperature of the liquid is kept constant, the temperature of the reaction mixture can be kept constant by regulating the feed rate of the liquid.

The temperature of the reaction mixture may also be kept constant by adjusting the feed rate of burnt material.

The advantage of operating with constant temperature of the reaction mixture is that control is surprisingly reliable because the temperature dependancy of the process is eliminated.

It is advantageous to use the signal from the reactor, the volume of heat liberated per unit of time, for regulating the amount of fuel fed to the kiln. This ensures fast regulation. It may also be advantageous to use the signal for regulating the raw material supply, or, when burning in a rotary kiln, for regulating the rotational speed of the kiln.

Often, the burning process is succeeded by a slaking process. In such case, a slaking chamber of the slaking process may be used as reaction chamber for the control. This contemplates the simplest apparatus. However, for reasons of accurateness, it may be appropriate to use special reaction chambers having a shorter residence time.

It is also possible to convert the normal slaking machine into an isothermic reactor by providing it with means for direct steam heating or with heat exchangers for regulating the temperature of the slaking chamber and of the liquid feed. This results in the advantage of directly controlling the kiln according to the reactivity of the burnt product in the subsequent manufacturing process.

When using a special reaction chamber, the described automatic control of burning conditions in the kiln may advantageously be extended with a subsequent measuring of the actual temperature/heat development in the slaking chamber during the manufacturing process. This enables final optimization of the reactivity of the burnt product produced in the kiln by means of long-range adjustment of the reactivity level.

Supplemental control parameters for achieving the final optimum reactivity of the kiln product may also include:

(a) measuring the torque of the rotor(s) of the slaking machine;

(b) the conductivity of the mixture in or after the slaking machine;

(c) automatic conducting chemical analysis or titration of the mixture in the slaking machine or in subsequent receivers and apparatus; or (d) measuring turbidity of the mixture at the same places as in (c).

Also the electrical conductivity of, or the OH concentration in, the reaction mixture can be determined and used as the quantity constitution a measure for the amount of heat per unit weight of burnt material per unit of time liberated by the reaction.

The invention also includes a kiln control apparatus for carrying out the method according to the invention. The apparatus comprises a reaction chamber provided with an agitator and temperature measuring means, first feed means for introducing into the reaction chaamber burnt material of a substantially continuously uniform fineness and a second feed means for introducing a liquid reagent into the reaction chamber. Means for measuring and maintaining desired vaalues of feed rate and temperature of reaction components fed to the reaction chamber and outlet means for removing reaction mixture from the reaction chamber are also included. The invention further comprises signal processing means for providing a signal which indicates the amount of heat liberated in the reaction chamber per unit weight of burnt material per unit time is connected to the temperature measuring device and the measuring and maintaining means. A control means for controlling the burning process is dependant upon an output signal from and is connected to the signal processing means whereby burning of $CaCO_3$ and $MgCO_3$ materials are automatically controlled.

Preferred embodiments of the apparatus are characterized in that the signal processing means also controls:
(a) the heat exchange means in the reactor,
(b) the temperature of the liquid reagent being fed to the reactor,
(c) the amount of the liquid reagent being fed to the reactor, or
(d) the amount of burnt material fed to the reactor, so that the temperature of the reaction mixture is substantially constant.

The control device of the apparatus may be arranged to regulate the amount of fuel fed to the kiln, the amount of raw material fed to the kiln and when the burning takes place in a rotary kiln, the rotational speed of the kiln.

BRIEF DESCRIPTION OF THE DRAWING

Preferred embodiments of the present invention are described, by way of example only, with reference to the accompanying drawing.

BEST MODE FOR CARRYING OUT THE INVENTION

As shown, the apparatus comprises means 1 for feeding burnt material of uniform fineness to reaction chamber 8 via a conveying device 2 equipped with means 3 and 4 respectively for measuring and maintaining desired values of feed rate and temperature of the burnt material introduced into the reaction chamber. The reaction chamber 8 is provided with an agitator 11, a temperature measuring device 12, an outlet 22, and means 5 for introducing water or other liquid reagent to the reaction chamber. Means 5 is equipped with means 6 and 7 respectively for measuring and maintaining desired values of feed rate and temperature of liquid reagent. Optionally, a heat exchange means 9 provided with a control device 10 controlling the heat output can be included. The apparatus further includes a data processing means 13 connected with means 3, 4, 6 and 7 via signal communication lines 14, 15, 16 and 17 respectively and with the temperature measuring device 12 via a signal communication line 18. A control device 19 is fed with the output from the data processing means via signal communication line 20. When the apparatus includes a heat source 9 with a control device 10, the latter is connected to the data processing means by a signal communication line 21.

According to the simplest embodiment, the reaction chamber does not have heat exchanger. Means 3, 4, 6 and 7 maintain constant feed rate and temperature of the reactants. In this embodiment, the magnitude of the temperature measured by the temperature measuring device 12 provides a direct measure for the heat production in the reaction chamber.

In many cases, temperature fluctuations of the burnt material will merely lead to insignificant variations in the temperature measuring device 12. Thus it is possible to dispense with the means 4 for measuring and maintaining a desired value of the temperature of the burnt material.

According to a preferred embodiment, however the reaction chamber is provided with heat exchanger 9, and means 3, 4, 6 and 7 are used to maintain constant values of feed rate and temperature. The signal processing means controls the amount of heat given off by the heat exchanger in order to keep the temperature of the reaction mixture at a desired value. In this case, the control signal to the heat exchanger varies inversely to the heat production in the reaction chamber derived from the chemical reaction.

In a typical embodiment, the output from the signal processing means, which is a measure for the heat production per minute per gram burnt material measured in the reactor, is used for controlling the fuel feed rate to the burning process.

It is unnecessary to base an automatic kiln control 23 on intricate mathematical models, and accordingly, the signal processing means may preferably use empirical data. In this case, both the aforesaid measurement and its trend can be used as main product quality parameters together with other process parameters, for example, temperature, pressure and the like, to determine kiln operation situation triggering required control actions.

When carrying out the method according to the invention, the temperature of the water and that of the burnt material are typically 20°-25° C. At a residence time of about 10 minutes in the reaction chamber, the reaction of water with slightly burnt/normally burnt/hard lime will, for instance, lead to reactor temperatures of about 70°/60°/50° C., respectively, that is, temperature increases of about 50°/40°/30° C., respectively, in a nonisothermic case.

The burnt material fed to the reactor may be separated as a sub-flow from the burnt, cooled and perhaps crushed final product from the burning process. Because cooling and crushing process takes time, some time will elapse between the burning and measuring of the reactivity of the burnt product in the reactor. In cases where quick variations of the product quality may be expected, for example, because of a non-homogeneous raw material, it may be appropriate to reduce this time delay by branching off a sub-flow of the burnt product direct from the kiln or the cooler and pass this sub-flow directly to the reactor. The particle size of the material fed to the reactor is preferably smaller than 5 mm, and especially, smaller than 2 mm.

As reagent in the hydration reaction in the reactor, there may be employed water or an aqueous solution, for example, alkali salts. When the method according to the invention, for example, is used in connection with lime re-burning processes, it may be appropriate to use a green lye as the aqueous solution.

The reactor may be heat insulated. To insure particularly effective agitation, it is advantageous to provide the reactor with turbulence creating means, for example, plates.

It is not intended to limit the present invention to the specific embodiments described above. Thus it should be recognized that other changes may be made in the method and apparatus specifically described herein without deviating from the scope and teachings of this invention and that it is intended to encompass all other embodiments, alternatives and modifications consistent with the present invention.

I claim:
1. A method for controlling burning of materials selected from $CaCO_3$, $MgCO_3$ and mixtures thereof in a kiln comprising burning in a kiln; feeding a flow of burnt material and a flow of liquid reagent, in an aqueous solution, to a reaction chamber; maintaining a residence time less than the time required to reach equilib- rium in the reaction chamber and maintaining a substantially constant temperature in the reaction chamber; agitating said burnt material and liquid reagent; measuring the temperature and feed rate of said two flows fed to the reaction chamber; measuring the temperature of said agitated burnt material and liquid reagent; determining reactivity, a measure of the amount of heat per unit weight burnt material per unit of time liberated by reaction between said burnt material and said liquid reagent; and using said reactivity as a control parameter for said burning of $CaCO_3$ and $MgCO_3$ materials.

2. The method according to claim 1 wherein the burning of the $CaCO_3$ and $MgCO_3$ materials is automatically controlled.

3. The method according to claim 1 wherein the burnt material is fed continuously to the reaction chamber.

4. The method according to claim 1 wherein the liquid reagent is fed continuously to the reaction chamber.

5. The method according to claim 1 wherein residence time in the reaction chamber is less than a time period of fluctuations of burning conditions.

6. The method according to claim 1 wherein the burning of material in the kiln is controlled by regulating amount of fuel fed to the kiln.

7. The method according to claim 1 wherein the burning of the material in the kiln is controlled by regulating amount of raw material fed to the kiln.

8. The method according to claim 1 wherein the burning of the material is carried out in a rotary kiln and is controlled by regulating rotational speed of the kiln.

9. The method according to claim 1 wherein the electrical conductivity of the burnt-material, liquid-reagent mixture is used to determine said amount of heat provided in the kiln.

10. The method according to claim 1 wherein OH concentration in the burnt-material, liquid-reagent mixture is used to determine said amount of heat provided in the kiln.

11. The method according to claim 1 wherein said liquid reagent is water.

12. The method according to claim 2 including maintaining a substantially constant temperature of the mixture of burnt material and liquid reagent by adding or subtracting heat therefrom by heat transfer means.

13. The method according to claim 7 including determining the amount of heat liberated by the reaction by measuring heat given off or absorbed by said heat transfer means.

14. The method according to claim 12 including regulating liquid reagent feed temperature.

15. The method of claim 14 including maintaining the temperature of the reaction mixture substantially constant by supplying heat to said liquid reagent.

16. The method according to claim 12 including maintaining substantially constant liquid reagent feed temperature.

17. The method according to claim 16 including regulating feed rate of said liquid reagent.

18. The method according to claim 12 including maintaining a substantially constant burnt material feed temperature.

19. The method according to claim 18 including regulating feed rate of the burnt material to the reaction chamber.

20. The method according to claim 1, wherein the residence time is about 10 minutes.

21. A method for automatically controlling the burning of materials selected from $CaCO_3$, $MgCO_3$ and mixtures thereof in a rotary kiln comprising burning materials selected from $CaCO_3$, $MgCO_3$ and mixtures thereof in a kiln; continuously feeding to a reaction chamber a flow of burnt material having a particle size less than about 5 mm. and a flow of liquid reagent, in an aqueous solution; maintaining a residence time less than the time required to reach equilibrium in the reaction chamber and maintaining a substantially constant temperature in the reaction chamber; agitating said burnt material and liquid reagent in said reaction chamber; measuring the temperature and feed rate of said two flows to said reaction chamber; measuring the temperature of said agitated burnt material and liquid reagent; measuring the heat given off or absorbed by a heat transfer means; determining reactivity, a quantity constituting a measure of the amount of heat per unit weight of burnt material per unit of time liberated by the reaction between said burnt material and said liquid reagent; using said reactivity as a control parameter for the burning of the materials; and regulating the rotational speed of said rotary kiln as a function of said control parameter.

* * * * *

UNITED STATES PATENT AND TRADEMARK OFFICE
CERTIFICATE OF CORRECTION

PATENT NO. : 4,283,202
DATED : August 11, 1981
INVENTOR(S) : J. Friis-Hansen

It is certified that error appears in the above-identified patent and that said Letters Patent are hereby corrected as shown below:

Column 3, line 52, "suitble" should read --suitable--;

Column 6, line 65, "burning in a kiln" should read --burning $CaCO_3$ and/or $MgCO_3$ materials in a kiln--;

Column 8, line 27, "burning materials selected from $CaCO_3$, $MgCO_3$ and mixtures thereof in a kiln" should read --burning $CaCO_3$ and/or $MgCO_3$ materials in a kiln.

Signed and Sealed this

Tenth Day of November 1981

[SEAL]

Attest:

GERALD J. MOSSINGHOFF

*Attesting Officer*   *Commissioner of Patents and Trademarks*